United States Patent
Yan et al.

(10) Patent No.: US 7,991,913 B2
(45) Date of Patent: Aug. 2, 2011

(54) METHOD FOR DOMAIN NAME CONFIGURATION IN IPV6 ACCESS NETWORK AND THE NETWORK DEVICE HEREOF

(75) Inventors: Renxiang Yan, Shanghai (CN); Yinglan Jiang, Shanghai (CN); Qingshan Zhang, Shanghai (CN); Haibo Wen, Shanghai (CN)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/097,377

(22) PCT Filed: Jul. 17, 2006

(86) PCT No.: PCT/CN2006/001705
§ 371 (c)(1),
(2), (4) Date: Sep. 9, 2008

(87) PCT Pub. No.: WO2007/068167
PCT Pub. Date: Jun. 21, 2007

(65) Prior Publication Data
US 2008/0320111 A1    Dec. 25, 2008

(51) Int. Cl.
*G06F 15/16* (2006.01)
(52) U.S. Cl. ........................................ 709/245; 709/229
(58) Field of Classification Search .................. 709/245, 709/246, 227–228
See application file for complete search history.

(56) References Cited

U.S. PATENT DOCUMENTS

| | | | | |
|---|---|---|---|---|
| 7,313,632 | B2 * | 12/2007 | Hwang | 709/245 |
| 7,321,598 | B2 * | 1/2008 | Blanchet et al. | 370/466 |
| 7,385,981 | B2 * | 6/2008 | Choi et al. | 370/392 |
| 7,450,499 | B2 * | 11/2008 | Park et al. | 370/229 |
| 7,463,614 | B2 * | 12/2008 | Bhatia et al. | 370/338 |
| 2004/0037316 | A1 * | 2/2004 | Choi et al. | 370/466 |
| 2004/0230446 | A1 | 11/2004 | Park et al. | |
| 2009/0041058 | A1 * | 2/2009 | Ikeda et al. | 370/475 |

FOREIGN PATENT DOCUMENTS

| | | |
|---|---|---|
| CN | 1694459 A | 11/2005 |
| WO | 02052794 A1 | 7/2002 |

* cited by examiner

*Primary Examiner* — Hussein A Elchanti
(74) *Attorney, Agent, or Firm* — Sughrue Mion, PLLC

(57) ABSTRACT

The present invention provides a method and device for hierarchical configuration of domain name in IPv6 network. Said method comprises: a) negotiating a unique user network's name between a user and a network SP; b) a client terminal device at the user network side obtaining prefix of IPv6 network address and suffix of the user network's domain name by sessioning with a network access device, said suffix of the user network's domain name being consisting of the user network's name and suffix of the network SP's domain name; c) the network access device further informing the network SP's DNS server of establishing the resource record of said user network's domain name server; d) said client terminal device conducting the address configuration and providing domain name service for hosts at the user network side according to the obtained prefix of IPv6 network address and suffix of the user network's domain name.

10 Claims, 5 Drawing Sheets

METHOD FOR DOMAIN NAME CONFIGURATION IN IPV6 ACCESS NETWORK AND THE NETWORK DEVICE HEREOF

FIELD OF THE INVENTION

The present invention relates to IPv6 application in the communication network and computer network, and particularly the method and network device for domain name configuration in IPv6 network.

BACKGROUND OF THE INVENTION

The main function of DNS ("Domain Name System") is to accurately locate network resources on the basis of the corresponding relationships between domain names and IP addresses, namely to search IP addresses according to their domain names.

FIG. 1 is a flow chart which schematically shows a typical tree structure of domain space. At the most upper of the chart, the only root of the DNS tree structure is denoted by dot ".". The next level of the root is called as Top Level Domain (e.g., "com"), the next level of the Top Level Domain is Second Level Domain (e.g., "shtele.com"), the next level of the Second Level Domain is Third Level Domain (e.g., "John.shtele.com"), and the rest may be inferred. Each domain is a subdomain of its superior domain, and has a DNS server to store domain name information in the form of resource records. Ordinary types of resource records include: (1) A address record, which lists the corresponding relationship between the IP address of the specific host's name and its domain name, which is an important record for domain name resolution; (2) AAAA address record, which translates DNS domain name into 128-bit IPv6 address; (3) Domain Name Server record, which assigns the relationship between the IP address of the domain name server dominating a given region and its domain name; and other types of resource records. When utilizing DNS service, users need not understand the typical tree-structural hierarchy for domain space of DNS in detail. And they only need to designate one DNS server or use Dynamic Host Configuration Protocol ("DHCP") and other relevant technology when configuring network. Users' application programs can access DNS system through the resolver embedded in the operating system to search the information of network resources in relation to domain names.

The deployment of IPv6 eases the pressure resulting from the limitation of addresses existing in IPv4, while it is much more difficult to memorize a 128-bit IPv6 address as compared with a IPv4 address. Therefore, the domain names are used more widely in IPv6 network. In IPv6 network, each device will be registered with a globally unique domain name by the domain name configuration system. For instance, in IPv6 home network, each home device will possess an IPv6 address in the near future, and users are able to remotely access their home network devices by means of the domain name configuration.

Currently, there are two methods for domain name configuration in IPv6: (1) manually adding resource records (the translating relationships between addresses and domain names) to the DNS server of the present level; (2) At present automatic configuration RA ("Router Advertisement") option, DHCPv6 option and DDNS ("Dynamic Domain Name Server") option. RA option: it defines RDNSS, a new Neighbor Discovery (ND) option containing the DNS server's address and being able to utilize current ND request and advertisement options, which is illustrated in FIG. 2A; DHCPv6 option: illustrated in FIG. 2B, in the condition of stateful DNS server discovery, DHCPv6 employs FQDN (Fully Qualified Domain Name) option of DHCP to enable the terminal device to automatically register a domain name on the DNS server when configuring the DHCPv6 service; DDNS option: illustrated in FIG. 2C, DDNS Option installs DDNS client software on the user's host and thus enables it to automatically register one domain name on a remote DDNS server after each address configuration. In this way, other hosts can access the user's host via DDNS server even if the user's host has no fixed IP address.

The aforesaid automatic configuration methods are only applicable to a simple user network within a local area, such as enterprise network, campus network or home network. As to large-area access network, there would be lots of limitations if the above domain name configuration methods were employed: (1) the negotiations of registration requests from enormous users' hosts on the network SP's ("Service Provider") DNS server are not secure and difficult to be managed. (2) The biggest defect of DDNS is that each device need to be installed with DDNS client software, and logging on and authentication must be also conducted, which is not suitable for the circumstance such as IPv6 home network which has many home devices. Moreover, in DDNS, the users could not clearly know about the domain name status of their own home devices and conduct unified management such as modification and deletion, etc.

Therefore, for users within large area, a mechanism of hierarchical management should be established to easily manage domain names. At the same time, it is necessary to conduct hierarchical configuration of domain name between the DNS server in local scale and the network SP's DNS server so as to realize the remote access to devices in local scale, such as the terminal devices in the home network.

SUMMARY OF THE INVENTION

One object of the present invention is to provide one method for hierarchical configuration of domain name in IPv6 network, comprising: a) negotiating one unique user network's name between a user and a network SP; b) a client terminal device at the user network side obtaining prefix of IPv6 network address and suffix of the user network's domain name by sessioning with a network access device, said suffix of the user network's domain name being consisting of the user network's name and suffix of the network SP's domain name; c) the network access device further informing the network SP's DNS server of establishing the resource record of said user network's domain name server; and d) said client terminal device conducting address configuration and providing domain name service for hosts at the user network side according to the obtained prefix of IPv6 network address and suffix of the user network's domain name.

Preferably, the sessioning step in step b) comprises: b1) conducting access authentication, and upon the authentication succeeds the network access device obtaining the user network's name corresponding to the user network; b2) executing DHCP, obtaining information of prefix of IPv6 network address and the network SP's domain name, and further forming suffix of the user network's domain name.

Preferably, step c) comprises that the client terminal device informs the network SP's DNS server of establishing the resource record of said user network's domain name server One object of the present invention is to further provide a device for hierarchical configuration of domain name in IPv6 network, comprising an authentication unit, a DHCP unit and a DNS registration unit, wherein the authentication unit is used for authenticating the client terminal device at the user network side, and providing corresponding user network's name upon the authentication succeeds; the DHCP unit is used for providing the client terminal device at the user network side with information of prefix of IPv6 network address and suffix of the user network's domain name, and said suffix of the user network's domain name is consisting of the user network's name and suffix of the network SP's domain name; and DNS registration unit is used for informing the network SP's DNS server of establishing resource record of said user network's domain name server.

Preferably, the aforesaid authentication unit asks a remote authentication server for authentication, and then remote authentication server will provide the user network's name upon the authentication succeeds.

Preferably, the aforesaid network device further comprises a domain name registration unit, which is used for providing registration of user network's name and confirming its uniqueness through the authentication unit.

One object of the present invention is to provide one IPv6 access network system further. The system comprises the aforesaid network access device and client terminal devices which configure address and provide domain name service for terminal devices at the user network side on the basis of obtained information of prefix of network address and suffix of the user network's domain name.

Based on aforesaid thinking of the invention, the problem concerning hierarchical management of domain name registration in large scale could be effectively solved by forming unique suffix of domain name for each user network. When the user conducts network connection, access network devices automatically configure the resource records of the user network's domain name server on the network SP's DNS server, and realizes automatic hierarchical configuration between the DNS servers.

DETAILED DESCRIPTION OF EMBODIMENTS

Referring to the accompanying drawings, detailed description will be given to the preferred embodiments of the present invention.

Figure 3:
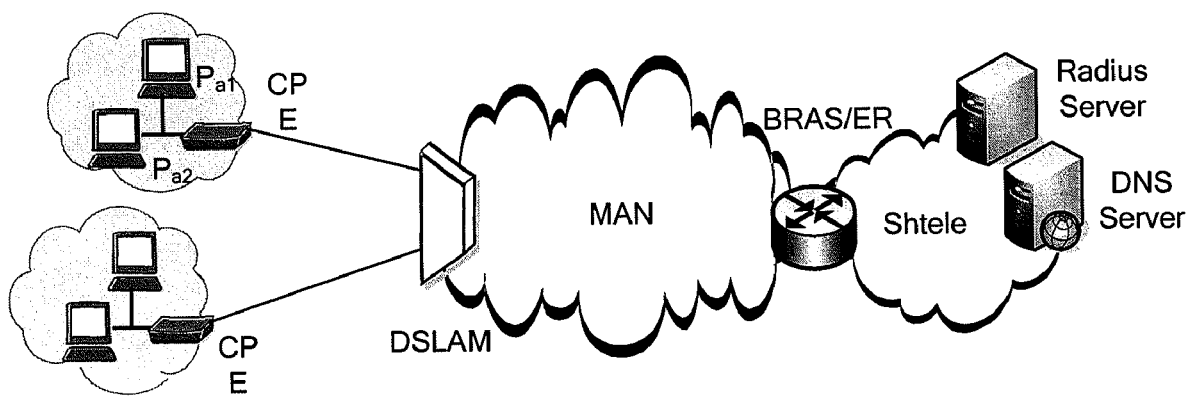
FIG. 3 is a schematic view of a typical IPv6 access network system.

FIG. 3 is a schematic view of one typical IPv6 access network system, in which the Customer Premises Equipment (CPE) is a Layer-3 routing device located in the user network (e.g., home network), and integrates DHCP server and DNS server serving all user's hosts (Pa1, Pa2, etc.) in the area of the home network; the network access device such as DSLAM (Digital Subscriber Line Access Multiplexer) or LAN-SWITCH is used for access connection and relevant access configuration of the CPE, e.g., IPv6 address configuration; the RADIUS server and the DNS server are located in the network SP, and provide the user with authentication service and DNS domain name service by Broadband Remote Access Server/Edge Router (BRAS/ER).

Figure 4:
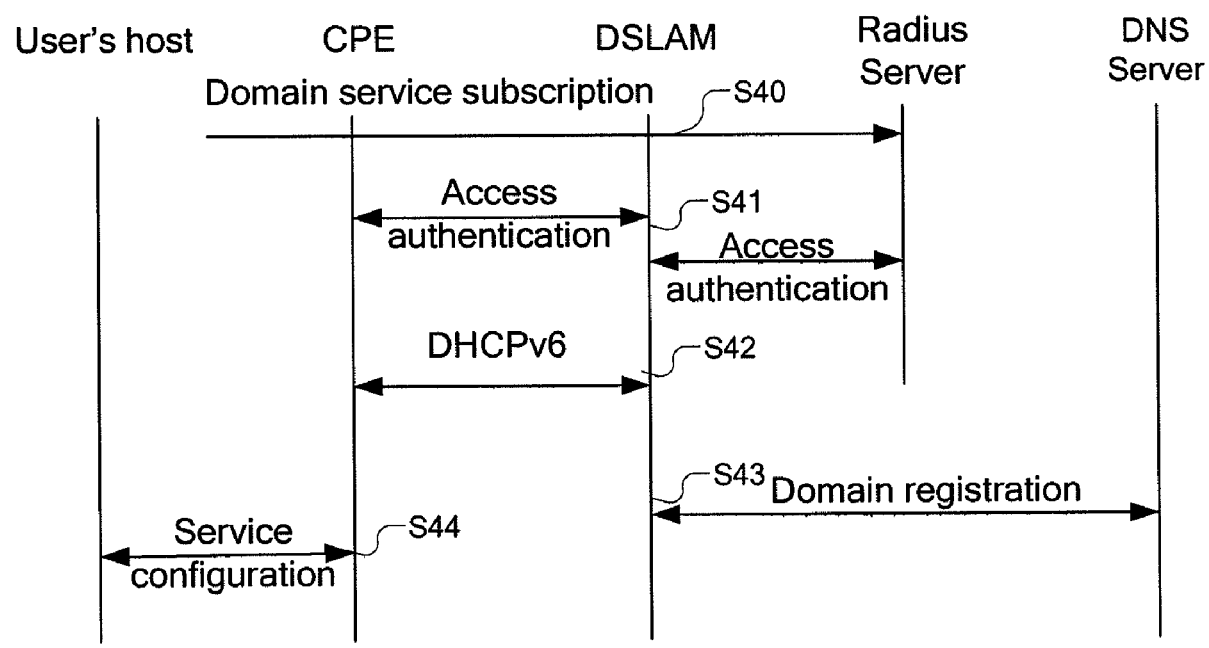
FIG. 4 is a flow chart of method of hierarchical configuration for domain name in IPv6 access network provided by the present invention.

FIG. 4 is a flowchart of DHCPv6 based domain name configuration in IPv6 access network provided by the present invention:

In step S40, a user applies for domain name service, and negotiates a unique user network's name with a network SP.

One convenient and feasible method for negotiation can be that the user logs on the domain name service and registration web site of the network SP, chooses his/her favorite family name like "John", then the network SP confirms the uniqueness of this family name, and after negotiation this family name could be stored in the user's configuration file in the RADIUS authentication server.

The user network's name could also be allocated by the network SP and stored in the user's configuration file.

In step S41, while the CPE at the home network side connecting IPv6 network, access authentication should firstly be conducted, and then the network access device will obtain the user network's name corresponding to the home network after the authentication succeeds.

For instance, concerning the authentication mechanism of 802.1x the user name/password sent to the DSLAM will be sent to the RADIUS authentication server for authentication. After the authentication succeeds, the RADIUS authentication server would return the user's relevant configuration information including the user's registered family name, which will be temporarily stored in the DSLAM.

In step S42, after authentication succeeds, the CPE will start a DHCP session with the DSLAM, and a DHCP client terminal on the CPE would request service configuration information from the DHCP server in the DSLAM. These information include prefix of IPv6 network address allocated by the network SP for users and relevant configuration information (default gateway and DNS server, etc.).

Therefore, the DLSAM could further form suffix of the home network's domain name. This suffix of the home network's domain name is consisting of the combination of the user's family name previously stored in the DSLAM and the suffix of the network SP's domain name configured on the DHCP server. For example, the user's family name is "John" and the suffix of the network SP's domain name is "chinatele.com", so the suffix of the home domain name is "John.chinatele.com". Due to the uniqueness of the family name, the suffix of the home domain name is also unique.

Figure 5:
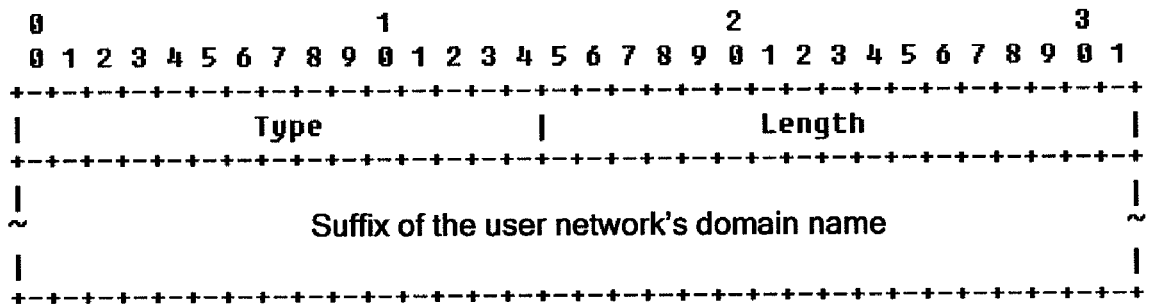
FIG. 5 is a mechanism of transferring the suffix of the user network's domain name provided by DHCPv6.

As shown in FIG. 5, the transferring of the suffix of the user home domain name could be realized by a defined protocol option in DHCPv6.

After the DHCP session ends, the CPE will obtain one unique IPv6 address. This address could be automatically generated by the CPE based on the obtained prefix of network address, or assigned by the DHCP server. Under the present circumstance, the assignment of DHCP server is a preferred embodiment since the operator wants to know the CPE address.

In step S43, the network access device sends a configuration command to the network SP's DNS server, and configures the resource record of the user network's domain name server, namely the corresponding relationship between CPE address (e.g., the address of user network's DNS server) and information of suffix of the home domain name, on the network SP's DNS server (e.g., redirection information). In this way, DNS inquiry information which is directed to terminal devices inside the user home network could be transferred to the user home network's DNS server.

Preferably, the network access device or CPE could employ Dynamic DNS Update Protocol to inform the DNS server of establishing resource record of user network's domain name server. It should be noted that if there is no DHCP server integrated in the network access device, the DHCP server could also send a configuration command to the DNS server. The user network's name could be directly sent to the DHCP server by the RADIUS authentication server, or relayed to the DHCP server by the DHCP Relay of the network access device by "RADIUS Attributes Option" of DHCP protocol.

Figure 1:
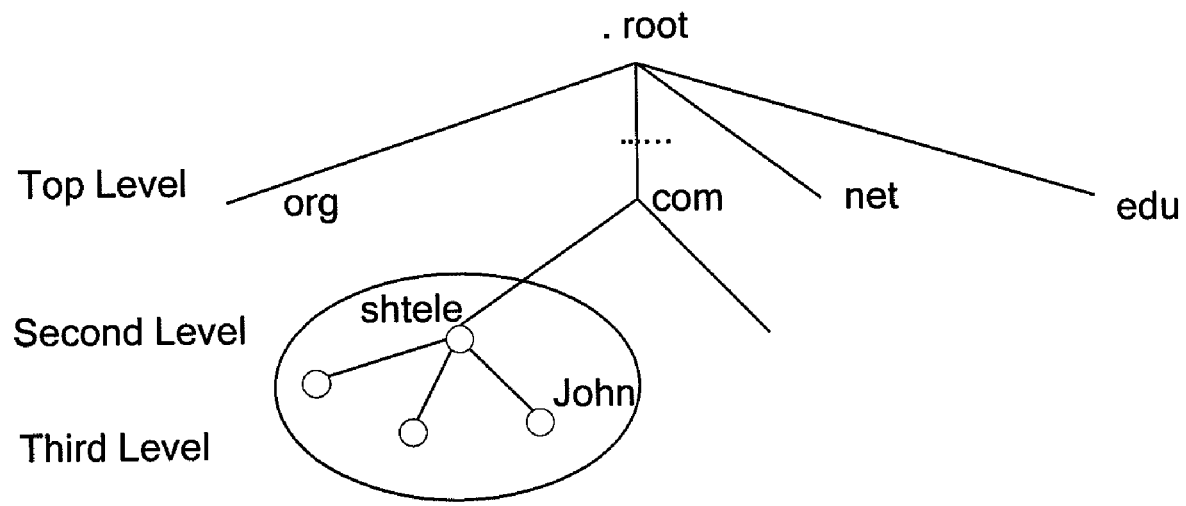
FIG. 1 is a schematic view of typical tree structure of domain name space.
Figure 2A:
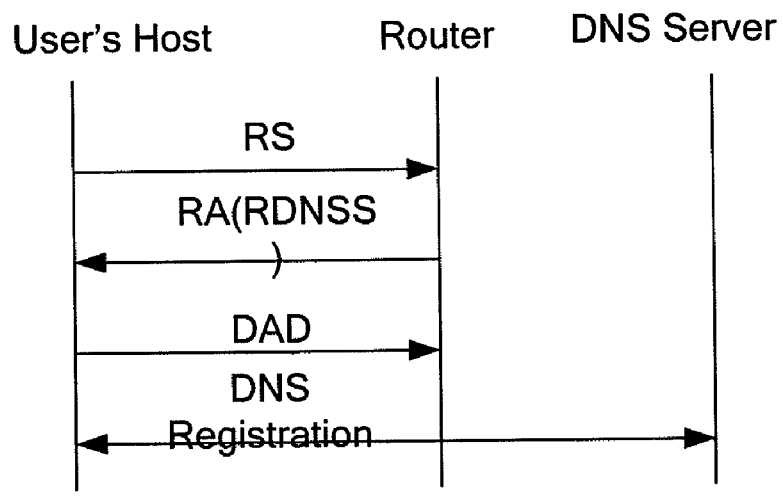
FIG. 2A shows a method of automatic configuration for domain name in IPv6 network-RA option.
Figure 2B:
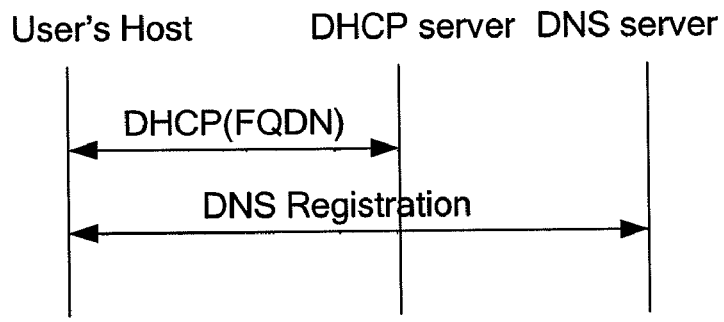
FIG. 2B shows a method of automatic configuration for domain name in IPv6 network-DHCPv6 option.
Figure 2C:
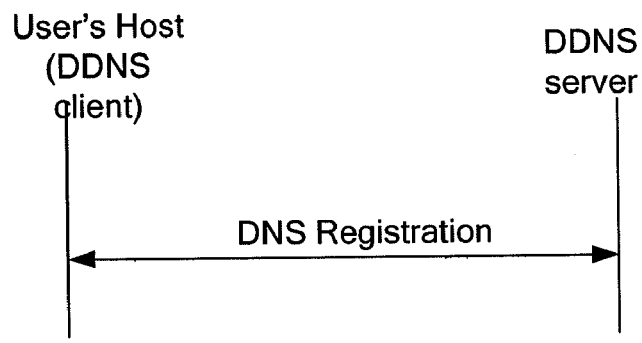
FIG. 2C shows a method of automatic configuration for domain name in IPv6 network-DDNS mechanism.

In step S44, after completion of the DHCP session, the CPE at home network side would configure the DHCP server and DNS server embedded in the CPE with the received information of the prefix of address and suffix of the home domain name. For example, the information is written into configuration file in the DHCP server, and the information of the suffix of domain name is used to configure relevant configuration file in the DNS server. These processes could be completed automatically by the configuring module in the CPE. When a new user's host is connecting to home network, the relevant service configuration will be done, which comprises the configuration of IPv6 stateless address and the configuration of DHCPv6, and its automatic domain name registration can be completed in DHCPv6 session by using DHCPv6 option illustrated in FIG. 2. In this way, each home device can own its unique domain name.

According to another embodiment of the present invention, after completion of DHCP session, said CPE at the home network side can inform the network SP's DNS server of establishing the resource record of the home network's domain name server.

Figure 6:
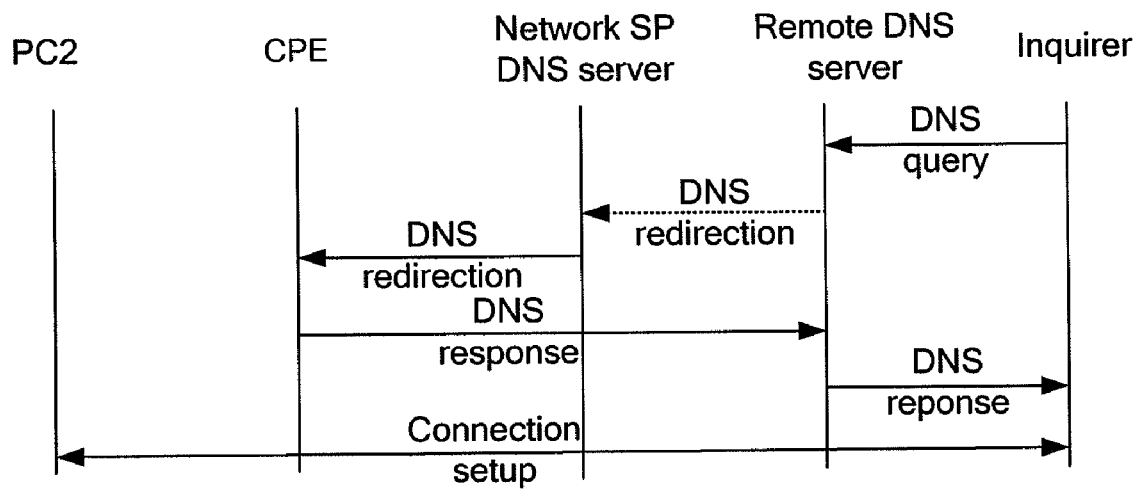
FIG. 6 is a schematic view of a remote host's accessing to a home network terminal PC2 according to the present invention.

FIG. 6 is a schematic view of remote accessing to a home network terminal PC2; when host PC1 or other remote hosts ("inquirer") away from the home network want to access the user's host PC2 inside the home network with the domain name "PC2", for example, they request access to PC2.John.chinatele.com. This DNS inquiry request will be sent to the DNS server of the operator (chinatele.com) by its local DNS server, and the DNS server of the operator will direct this request to the DNS server of the CPE according to suffix of the domain name (John.chinatele.com) and redirection information configured on the DNS server. Therefore, CPE will send the IP address of the requested user's host PC2 to the inquirer's local DNS server, and then this local DNS server transmits the information to the host PC1 or other remote hosts sending said request.

Figure 7:
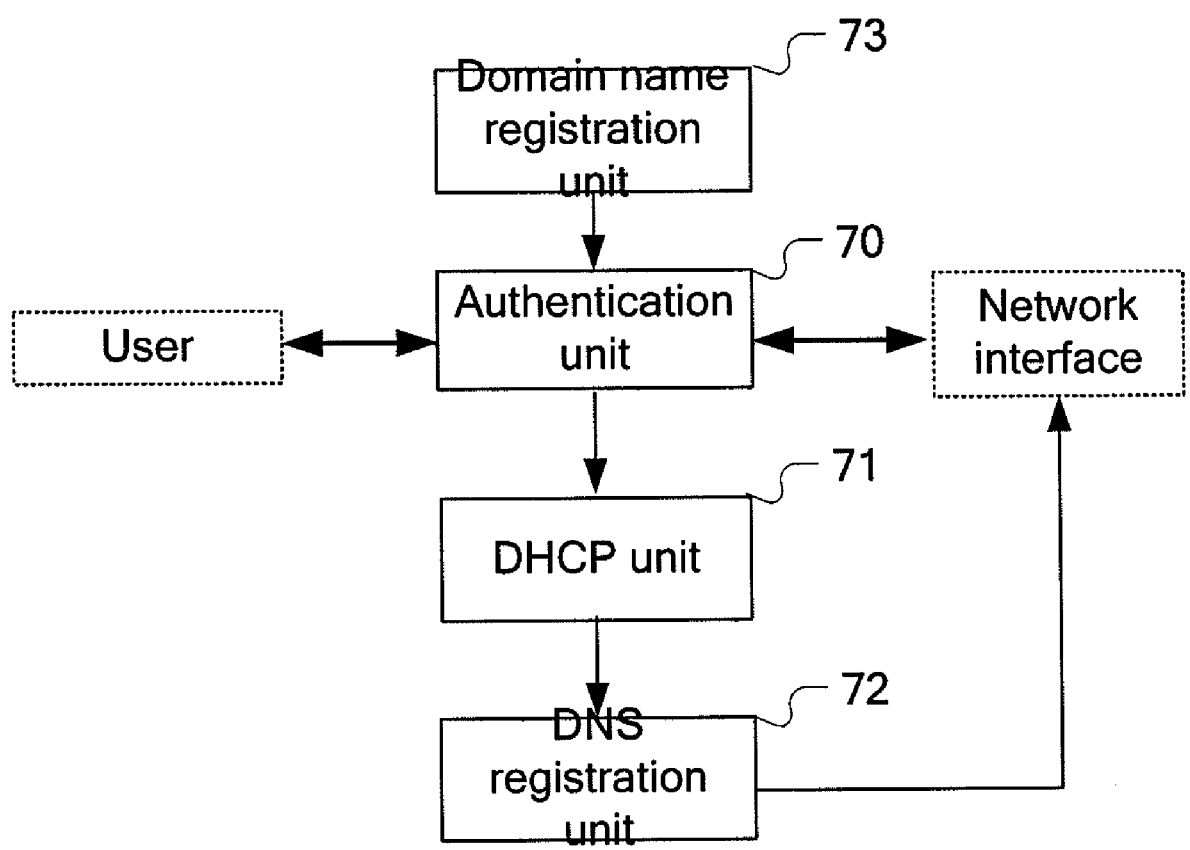
FIG. 7 is a schematic view of the structure of the network device for hierarchical configuration of domain name of the present invention.

FIG. 7 is a schematic view of the structure of the network device for hierarchical configuration of domain name according to the present invention, which is implemented in the network access device "DSLAM", and said device for hierarchical configuration of domain name comprises an authentication unit 70, a DHCP unit 71 and a DNS registration unit 72, wherein, The authentication unit 70 is used for authenticating the CPE at the user network side and for providing the corresponding user network's name after the authentication succeeds. If the registration and providing of the user network's name are completed by other devices in network, such as a remote authentication server, this authentication unit will request the remote authentication server for authenticating and then return the registered user network's name to the user after the success of the authentication.

In the present invention, the DHCP unit 71 is implemented as a DHCP server, which is correspondingly configured with the information of the network SP's domain name, including the suffix and DNS address of the network SP's domain name. After the authentication of CPE at the user network side succeeds, the DHCP client in the CPE will request the DHCP unit for the information of the service configuration. Then it will provide CPE at the user network side with the information of the prefix of IPv6 network address and the suffix of the user network's domain name, and said suffix of the user network's domain name is consisting of the combination of the aforesaid user network's name output by the authentication unit 70 and the suffix of the network SP's domain name configured on DHCP server.

After DHCP session ends, the CPE will obtain a unique IPv6 address, and this address could be automatically generated by the CPE according to the obtained prefix of network address, or assigned by the DHCP server.

The DNS registration unit 72 is used for informing the network SP's DNS server of establishing or updating the resource record of said user network's domain name server, i.e., the corresponding relationship between CPE address (the address of user network's DNS server) and suffix information of the user network's domain name via network interface.

In addition, the device for hierarchical configuration of domain name of the present invention could further comprise a domain name registration unit 73 which is used for providing registration and updating of the user network's name, the uniqueness within the network SP's area of which is confirmed by the authentication unit 70.

The aforesaid device for hierarchical configuration discloses the configuration of each functional unit realizing the present invention in the network access device "DSLAM". The circumstances under which DHCP sever is external should be noted. Under one circumstance, the DHCP unit 71 can be a DHCP Relay. After the authentication of the CPE at the user network side succeeds, the DHCP client on CPE will request the DHCP server for information of service configuration via this DHCP Relay, and the DHCP Relay can also obtain information of the prefix of IPv6 network address and the suffix of the user network's domain name provided by CPE at the user network side. This suffix of the user network's domain name is consisting of the aforesaid user network's name output by the authentication Unit 70 and the suffix of the network SP's domain name configured on the DHCP server. Thus, the DNS registration unit 72 could further inform the network SP's DNS server of establishing or updating resource record of said user network's domain name server via network interface. Under another circumstance, the user network's name could be directly sent to DHCP server from RADIUS server, or transmitted to DHCP server by the DHCP Relay of the network access device on the basis of "RADIUS Attributes Option" of the DHCP protocol. Then the DHCP server further informs the network SP's DNS server of establishing or updating the resource record of said user network's domain name server via network interface.

The aforesaid device for hierarchical configuration of domain name could also be implemented in BRAS/ER.

Although the embodiments of the present invention have been described above, they are not used for limiting the protection scope of present invention. The modifications can be made by those skilled in the art without departing from the scope and spirit of the present invention, and all these modifications should be deemed as within its scope.

The invention claimed is:

1. A method for hierarchical configuration of domain name in IPv6 network, the method comprising:
   a) negotiating one unique user network's name between a user and a network service provider;
   b) a client terminal device at the user network side obtaining prefix of IPv6 network address and suffix of the user network's domain name by sessioning with a network access device, said suffix of the user network's domain name being consisting of the user network's name and suffix of the network service provider's domain name;
   c) the network access device further informing the network service provider's DNS server of establishing the resource record of said user network's domain name server; and
   d) said client terminal device conducting address configuration and providing domain name service for a host at the user network side on the basis of the obtained prefix of IPv6 network address and suffix of the user network's domain name.

2. The method for hierarchical configuration of domain name in IPv6 network according to claim 1, characterized in that, the sessioning step in step b) comprising:
   b1) conducting access authentication, and upon the success of the authentication, the network access device obtaining the user network's name corresponding to the user network; and
   b2) executing DHCP, obtaining prefix of IPv6 network address and information of the network service provider's domain name, and further forming suffix of the user network's domain name.

3. The method for hierarchical configuration of domain name in IPv6 network according to claim 2, characterized in that, said user network's name is configured in a authentication server, and is transmitted to the network access device upon the success of said access authentication.

4. The method for hierarchical configuration of domain name in IPv6 network according to claim 2, characterized in that, in step b), said network access device sending the information of the user network's domain name to the client terminal device by the agreed options in DHCP protocol.

5. The method for hierarchical configuration of domain name in IPv6 network according to claim 1, characterized in that, said step c) comprising the client terminal device informing the network service provider's DNS sever of establishing resource records of said user network's domain name server.

6. The method for hierarchical configuration of domain name in IPv6 network according to claim 1, performed by a network access device for hierarchical domain name configuration in IPv6 network comprising an authentication unit, a DHCP unit and a DNS registration unit, wherein:
   said negotiating step is performed by the authentication unit authenticating the client terminal device at the user network side and providing corresponding user network's name upon the authentication succeeds;
   the step of obtaining a prefix is performed by the DHCP unit providing the client terminal device at the user network side with information of prefix of IPv6 network address and suffix of the user network's domain name, said suffix of the user network's domain name consisting of the user network's name and suffix of the network service provider domain name; and
   said step of informing the network service provider's DNS server of establishing the resource record of said user network's domain name server is performed by the DNS registration unit informing the network service provider's DNS server of establishing resource records of said user network's domain name server.

7. A network access device for hierarchical domain name configuration in IPv6 network comprising an authentication unit, a DHCP unit and a DNS registration unit, wherein:
   the authentication unit is used for authenticating the client terminal device at the user network side and providing corresponding user network's name upon the authentication succeeds;
   the DHCP unit is used for providing the client terminal device at the user network side with information of prefix of IPv6 network address and suffix of the user network's domain name, said suffix of the user network's domain name is consisting of the user network's name and suffix of the network service provider domain name; and
   the DNS registration unit is used for informing the network service provider's DNS server of establishing resource records of said user network's domain name server.

8. The network access device according to claim 7, characterized in that, said authentication unit asks a remote authentication server for authentication, and then remote authentication server provides the user network's name after the authentication succeeds.

9. The network access device according to claim 7, characterized in that, further comprising a domain name registration unit used for providing registration of the user network's name and conform its uniqueness through the authentication unit.

10. An IPv6 access network system, comprising:
    the network access device according to claim 7;
    client terminal devices, used for configuring address and providing domain name service for terminal devices at the user network side according to obtained information of prefix of network address and suffix of the user network's domain name.

* * * * *